(12) United States Patent
Tran et al.

(10) Patent No.: US 9,417,908 B2
(45) Date of Patent: *Aug. 16, 2016

(54) MANAGING DATA DELIVERY BASED ON DEVICE STATE

(75) Inventors: Anh P. Tran, Seattle, WA (US); John Mark Miller, Kirkland, WA (US); Steven Oliver Elliott, Renton, WA (US); Lloyd Alfred Moore, Renton, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 337 days.

This patent is subject to a terminal disclaimer.

(21) Appl. No.: 13/342,219

(22) Filed: Jan. 3, 2012

(65) Prior Publication Data

US 2012/0102139 A1 Apr. 26, 2012

Related U.S. Application Data

(63) Continuation of application No. 12/147,826, filed on Jun. 27, 2008, now Pat. No. 8,112,475.

(51) Int. Cl.
*G06F 15/16* (2006.01)
*G06F 9/48* (2006.01)
(Continued)

(52) U.S. Cl.
CPC ............ *G06F 9/4843* (2013.01); *G06F 9/4893* (2013.01); *G06F 9/54* (2013.01); *H04L 29/06* (2013.01); *H04L 29/08072* (2013.01); *Y02B 60/144* (2013.01)

(58) Field of Classification Search
CPC .......................... H04L 29/06; H04L 29/08072

USPC ................. 709/203, 226, 228, 232, 220, 224
See application file for complete search history.

(56) References Cited

U.S. PATENT DOCUMENTS 5,369,798 A 11/1994 Lee
5,867,657 A 2/1999 Bolosky et al.
(Continued)

FOREIGN PATENT DOCUMENTS

EP 1715656 A1 10/2006
WO 2007007330 A2 1/2007

OTHER PUBLICATIONS

Valavani, et al., "MobiSxhare: Sharing Context-Dependent Data & Services from Mobile Sources", Retrieved at <<http://ieeexplore.ieee.org/xpl/freeabs_all.jsp?arnumber=1241203>>, IEEE/WIC International Conference on Web Intelligence, Oct. 13-17, 2003, pp. 8.

(Continued)

*Primary Examiner* — Khanh Dinh
(74) *Attorney, Agent, or Firm* — Judy Yee; Micky Minhas (57) ABSTRACT

Managing power-consuming resources on a first computing device by adjusting data delivery from a plurality of second computing devices based on a state of the first computing device. The state of the first computing device is provided to the second computing devices to alter the data delivery. In some embodiments, the first computing device provides the second computing devices with actions or commands relating to data delivery based on the device state. For example, the second computing devices are instructed to store the data, forward the data, forward only high priority data, or perform other actions. Managing the data delivery from the second computing devices preserves battery life of the first computing device.

20 Claims, 7 Drawing Sheets

(51) Int. Cl.
*H04L 29/06* (2006.01)
*H04L 29/08* (2006.01)
*G06F 9/54* (2006.01)

(56) References Cited

U.S. PATENT DOCUMENTS

| | | | |
|---|---|---|---|
| 6,112,061 | A | 8/2000 | Rapeli |
| 6,640,145 | B2* | 10/2003 | Hoffberg et al. ............... 700/83 |
| 6,975,941 | B1 | 12/2005 | Lau et al. |
| 7,099,689 | B2 | 8/2006 | Bahl et al. |
| 7,130,313 | B2 | 10/2006 | Pekonen |
| 7,139,813 | B1 | 11/2006 | Wallenius |
| 7,142,855 | B2* | 11/2006 | Bahl et al. ............... 455/432.2 |
| 7,155,487 | B2 | 12/2006 | Yau et al. |
| 7,260,072 | B2 | 8/2007 | Lee et al. |
| 7,286,845 | B2 | 10/2007 | Boariu et al. |
| 7,299,304 | B2 | 11/2007 | Saint-Hilaire et al. |
| 7,305,475 | B2 | 12/2007 | Tock |
| 7,324,474 | B2 | 1/2008 | Shirota et al. |
| 7,337,337 | B2 | 2/2008 | Hong |
| 7,401,147 | B2 | 7/2008 | Sikora et al. |
| 7,464,276 | B2 | 12/2008 | Rusu et al. |
| 7,552,349 | B2* | 6/2009 | Hassan et al. ............... 713/320 |
| 8,112,475 | B2* | 2/2012 | Tran et al. ............... 709/203 |
| 2002/0120696 | A1 | 8/2002 | Mousseau et al. |
| 2003/0105809 | A1 | 6/2003 | Yoshii et al. |
| 2003/0135643 | A1 | 7/2003 | Chiu et al. |
| 2003/0149809 | A1 | 8/2003 | Jensen et al. |
| 2004/0063442 | A1 | 4/2004 | Goldberg |
| 2004/0103411 | A1 | 5/2004 | Thayer |
| 2004/0196866 | A1 | 10/2004 | Park et al. |
| 2004/0224674 | A1 | 11/2004 | O'Farrell et al. |
| 2004/0224694 | A1 | 11/2004 | Zhao et al. |
| 2004/0225525 | A1 | 11/2004 | Weitzman |
| 2005/0043020 | A1 | 2/2005 | Lipsanen et al. |
| 2005/0071419 | A1 | 3/2005 | Lewontin |
| 2005/0096102 | A1 | 5/2005 | Mock et al. |
| 2005/0108322 | A1 | 5/2005 | Kline et al. |
| 2006/0013235 | A1 | 1/2006 | Farnham |
| 2006/0068832 | A1 | 3/2006 | Islam et al. |
| 2006/0116146 | A1 | 6/2006 | Herrod et al. |
| 2006/0200253 | A1 | 9/2006 | Hoffberg et al. |
| 2006/0248197 | A1 | 11/2006 | Evans et al. |
| 2007/0011292 | A1 | 1/2007 | Fritsch et al. |
| 2007/0053513 | A1* | 3/2007 | Hoffberg ............... 380/201 |
| 2007/0058605 | A1 | 3/2007 | Meylan et al. |
| 2007/0074217 | A1 | 3/2007 | Rakvic et al. |
| 2007/0097867 | A1 | 5/2007 | Kneckt et al. |
| 2007/0149186 | A1 | 6/2007 | Barbosa da Torre et al. |
| 2007/0177558 | A1 | 8/2007 | Ayachitula et al. |
| 2007/0259699 | A1 | 11/2007 | Homchaudhuri |
| 2008/0025378 | A1 | 1/2008 | Mahany et al. |
| 2008/0113656 | A1 | 5/2008 | Lee et al. |
| 2008/0120409 | A1 | 5/2008 | Sun et al. |
| 2008/0126751 | A1 | 5/2008 | Mizrachi et al. |
| 2008/0130541 | A1 | 6/2008 | Kokku et al. |
| 2008/0141049 | A1* | 6/2008 | Hassan et al. ............... 713/320 |
| 2008/0144580 | A1 | 6/2008 | Su et al. |
| 2008/0176548 | A1* | 7/2008 | Liang ............... 455/419 |
| 2008/0186028 | A1* | 8/2008 | Jones et al. ............... 324/426 |
| 2008/0215407 | A1 | 9/2008 | Pachon et al. |
| 2009/0182608 | A1 | 7/2009 | Tran et al. |
| 2009/0182802 | A1 | 7/2009 | Tran et al. |
| 2009/0183157 | A1 | 7/2009 | Tran et al. |
| 2009/0199192 | A1 | 8/2009 | Laithwaite et al. |
| 2009/0298535 | A1 | 12/2009 | Klein et al. |
| 2009/0307519 | A1 | 12/2009 | Hyatt |
| 2009/0327390 | A1 | 12/2009 | Tran et al. |
| 2009/0327491 | A1 | 12/2009 | Tran et al. |
| 2010/0195584 | A1 | 8/2010 | Wilhelmsson et al. |

OTHER PUBLICATIONS

Armstrong, et al., "Efficient and Transparent Dynamic Content Updates for Mobile Clients", Retrieved at <<http://www.usenix.org/events/mobisys06/full_papers/p56-armstrong.pdf>>, The 4th International Conference on Mobile Systems, Applications and Services, Jun. 19-22, 2006, pp. 56-68.
"ViaXML—Open XML Tools from Odyssey Software—Delivers Universal Secure Data Access, Mobile Device Management, Server Push with Action, Peer to Peer, and Notification", Retrieved at <<http://www.mobic.com/oldnews/2000/11/viaxml.htm>>, Retrieved Date: Mar. 10, 2008, pp. 2.
Notice of Allowance, Dated: Apr. 1, 2011, U.S. Appl. No. 12/237,797, pp. 9.
Non-final Office Action, Dated Apr. 15, 2011, U.S. Appl. No. 12/147,774, pp. 13.
AdvisoryAction, Dated Dec. 30, 2010, U.S. Appl. No. 12/147,774, pp. 2.
Shih, et al., "Wake on Wireless: An Event Driven Energy Saving Strategy for Battery Operated Devices", Retrieved at <<http://reasearch.microsoft.com/users/bahl/Papers/Pdf/mobicom02.pdf>>, International Conference on Mobile Computing and Networking, Proceedings of the 8th annual international conference on Mobile computing and networking, 2002, pp. 160-171.
Bahl, et al., "Reconsidering Wireless Systems with Multiple Radios", Retrieved at <<http://research.microsoft.com/users/bahl/Papers/Pdf/MultiRadio.pdf>>, ACM SIGCOMM Computer Communication Review, vol. 34, No. 5, Oct. 2004, pp. 39-46.
Chlamtac, et al., "Energy Conservation in Access Protocols for Mobile Computing and Communication", Retrieved at <<http://www.jasonredi.com/papers/pdf/ChlamtacKrishnanEtAl_JournalOfM icro98_ECOverview.pdf>>, Microprocessors and Microsystems Journal, 1998, pp. 1-11.
Rhee, et al., "Techniques for Minimizing Power Consumption in Low Data-Rate Wireless Sensor Networks", Retrieved at <<http://alumni.media.mit.edu/-deva/papers/wcnc.pdf>>, In Proceedings IEEE Wireless Communications and Networking Conference (WCNC), Mar. 2004, pp. 1-5.
"Pocket Power Manager 1.0", Retrieved at<< http://www.filedudes.com/Pocket_Power_Manager-download-47203.html>>>, Nov. 7, 2007, pp. 2.
Jeffay., "Scheduling Sporadic Tasks with Shared Resources in Hard-Real-Time Systems", Proceedings of the 13th IEEE Real-Time Systems Symposium, Dec. 1992, pp. 89-99.
Bhulai, et al., "Scheduling Time-Constrained Jobs in the Presence of Background Traffic", Proceedings of the 39th IEEE Conference on Decision and Control, vol. 02, Dec. 2000, pp. 1421-1426.
Jeffay, et al., "Rate-Based Resource Allocation Models for Embedded Systems", Lecture Notes in Computer 3 Science, vol. 2211, Proceedings of the First International Workshop on Embedded Software, Dec. 2001, pp. 204-222.
Yun, et al., "Event-Based Scheduling Algorithm for Rendering SMIL Documents", Fifth IEE International Conference on 3G Mobile Communication Technologies, 2004, pp. 509-513.
Cha, Bonnie., "Palm Announces Low-Cost Treo 680", Retrieved at <<http://reviews.cnet.com/4532-10921_7-0.html?author=5116399>>, Retrieved Dated: Oct. 12, 2006, pp. 4.
"Symbian S60 Manual", RoadSync Using Exchange ActiveSync, DataViz, Inc, Retrieved Date: Jul. 29, 2008, pp. 1-33.
"Battle of the Pushers: The Search for the Ideal Push Email Solution", Published by Rafe Blandford, Date: Sep. 10, 2007, pp. 13.
Non-final Office action mailed from the USPTO in U.S. Appl. No. 12/237,797, U.S., Nov. 1, 2010, pp. 5.
Final Office action mailed from the USPTO in U.S. Appl. No. 12/147,774, U.S., Oct. 15, 2010, pp. 23.
Kravets, et al., "Application Driven Power Management for Mobile Communication", Retrieved at << www-sal.cs.uiuc.edu/-rhk/pubs/winet98.ps>>, Wireless Networks, vol. 06, No. 4, Jul. 2000, pp. 1-20.
Pal, at el., "Improving Delivery Time Guarantees for Wireless Data Services", Retrieved at << http://ieeexplore.ieee.org/iel5/9178/29117/01311488.pdf?arnumber=1311488 >>, IEEE Wireless Communications and Networking Conference, WCNC, Mar. 21-25, 2004, pp. 2539-2544.
Zaharia, at el., "Fast and Optimal Scheduling over Multiple Network Interfaces", Retrieved at << http://www.acm.org/src/Matei/mateLhtml >>, 2007, pp. 16.

(56) References Cited

OTHER PUBLICATIONS

Pering, at el., "CoolSpots: Reducing the Power Consumption of Wireless Mobile Devices with Multiple Radio Interfaces", Retrieved at<< https://www.usenix.org/events/mobisys06/full_papers/p220-pering.pdf >>, The 4th International Conference on Mobile Systems, Applications and Services, Jun. 19-22, 2006, pp. 220-232.

Flinn, Jason., "Managing Battery Lifetime with Energy-Aware Adaptation", Retrieved at << http://www.cs.cmu.edu/-satya/docdir/p137-flinn.pdf >>, ACM Transactions on Computer Systems, vol. 22, No. 2, May 2004, pp. 137-179.

Pering, at el., "Exploiting Radio Hierarchies for Power-Efficient Wireless Device Discovery and Connection Setup", Retrieved at <<http://ieeexplore.ieee.org/iel5/9501/30140/01383368.pdf?tp=&isnumber=&arnumber=1383368>>, 18th International Conference on VLSI Design held jointly with 4th International Conference on Embedded Systems Design (VLSID'05), India, Jan. 2007, pp. 6.

Non-final Office action mailed from the USPTO in U.S. Appl. No. 12/147,774, U.S., May 14, 2010, pp. 11.

International Search Report and Written Opinion of International Application No. PCTJUS2009J058166, dated Apr. 23, 2010, pp. 10.

Yin, et al., "Power-Aware Prefetch in Mobile Environments", Retrieved at <<http://ieeexplore.ieee.org/stamp/stamp.jsp?arnumber=01022307>>, Proceedings of the 22nd International Conference on Distributed Computing Systems (ICDCS'02), IEEE, Jul. 2-5, 2002, pp. 8.

Cao, et al., "Cache-Miss-Initiated Prefetch in Mobile Environments", Retrieved at <<http://ieeexplore.ieee.org/stamp/stamp.jsp?arnumber=01263086>>, Proceedings of the 2004 IEEE International Conference on Mobile Data Management (MDM'04), IEEE, Jan. 19-22, 2004, pp. 12.

Tuah, et al., "Resource-AwareSpeculative Prefetching in Wireless Networks", Retrieved at <<http://portal.acm.org/citation.cfm?id=602413.602418>>, Wireless Networks 9, 2003, pp. 61-72.

* cited by examiner

MANAGING DATA DELIVERY BASED ON DEVICE STATE

CROSS-REFERENCE TO RELATED APPLICATION

This application is a continuation of commonly-owned, co-pending U.S. patent application Ser. No. 12/147,826, filed Jun. 27, 2008, the entire disclosure of which is hereby incorporated by reference herein for all purposes.

BACKGROUND

Mobile computing devices, such as mobile phones and personal digital assistants (PDA), have become increasingly popular in recent years. As the devices continue to get smaller, there are increasing limitations in resources such as memory, storage, bandwidth, and battery. Additionally, more applications now require increasing levels of such resources. For example, many applications execute recurring tasks such as synchronization with a server and real-time content updates that require frequent radio usage to persist connections. After the radio powers on to send data, the radio takes several seconds to power off (e.g., about 3 seconds on 2.5G networks and about 20 seconds on 3G networks). This radio "tail" absorbs power and diminishes device battery life. Further, there are other power inefficiencies in spinning up the radio and shutting down the radio.

Connected applications with real-time data push are being widely adopted by mobile users. The applications include electronic mail, personal information management, and other web applications. The servers pushing the data do not have enough device and network knowledge to preserve device battery life while providing a positive user experience.

SUMMARY

Embodiments of the invention enable a first computing device to manage the delivery of data to the first computing device from a plurality of second computing devices. The first computing device determines resource data associated with conditions of the first computing device. Settings for sending data from the second computing devices to the first computing device are identified based on the conditions. The settings are provided to the second computing device, or applied to adjust schedules for transmitting the data. The adjusted schedules are provided to the second computing devices. The second computing devices send the data to the first computing device based on the settings, or the adjusted schedules.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
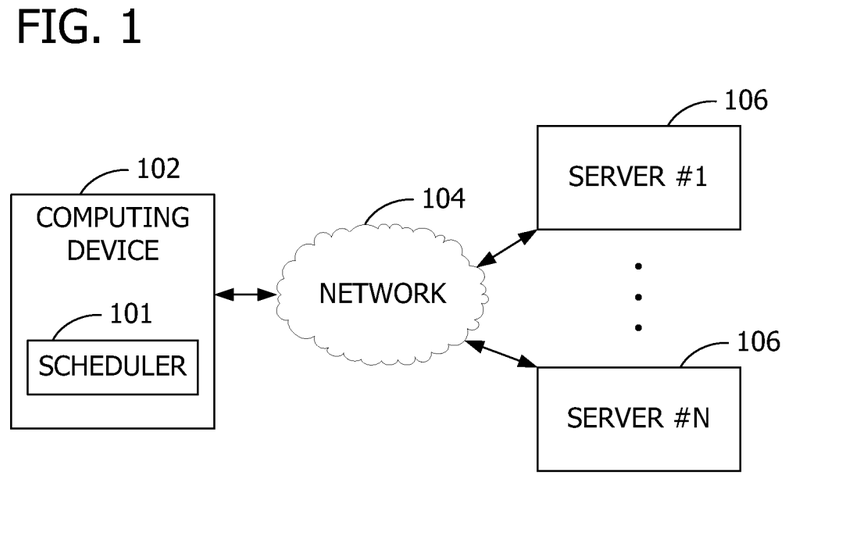
FIG. 1 is an exemplary block diagram of a computing device communicating with a plurality of servers.
Figure 2:
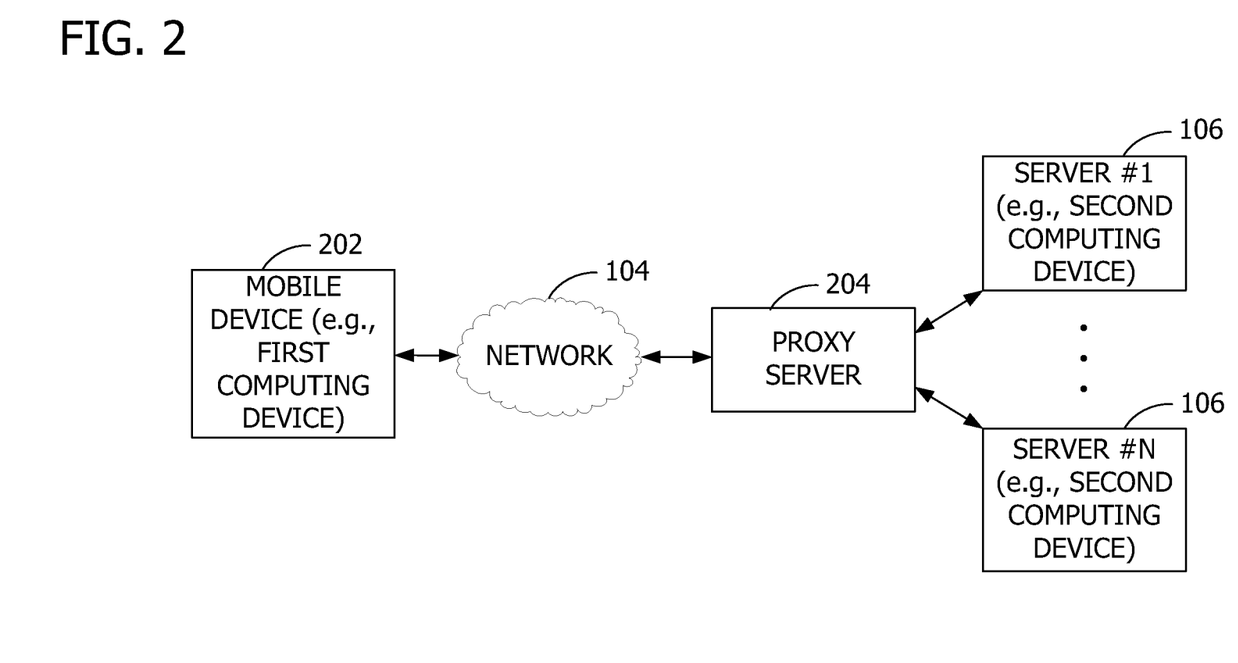
FIG. 2 is an exemplary block diagram illustrating a mobile device communicating with a plurality of servers through a proxy device.

Referring to the figures, embodiments of the invention provide a scheduler 101 executing on a computing device 102. The computing device 102 communicates via a network 104 with a plurality of servers 106 such as server #1 through server #N, where N is a positive integer. The servers 106 execute services to send data to the computing device 102 based on recurrent schedules 304 defined to occur periodically (e.g., regularly or intermittently). In some embodiments, the servers 106 execute or activate the schedules 304 to provide real-time content updates to the computing device 102. The servers 106 may also send heartbeat pings to keep open the connection between the servers 106 and computing device 102. For example, some of the services push mail, calendar, contacts, and instant messaging data. Other services act as a gateway or proxy server 204 such as shown in FIG. 2 to enable the servers 106 (e.g., second computing devices) to keep a mobile device 202 (e.g., a first computing device) updated with content or connected to social networks.

Figure 4:
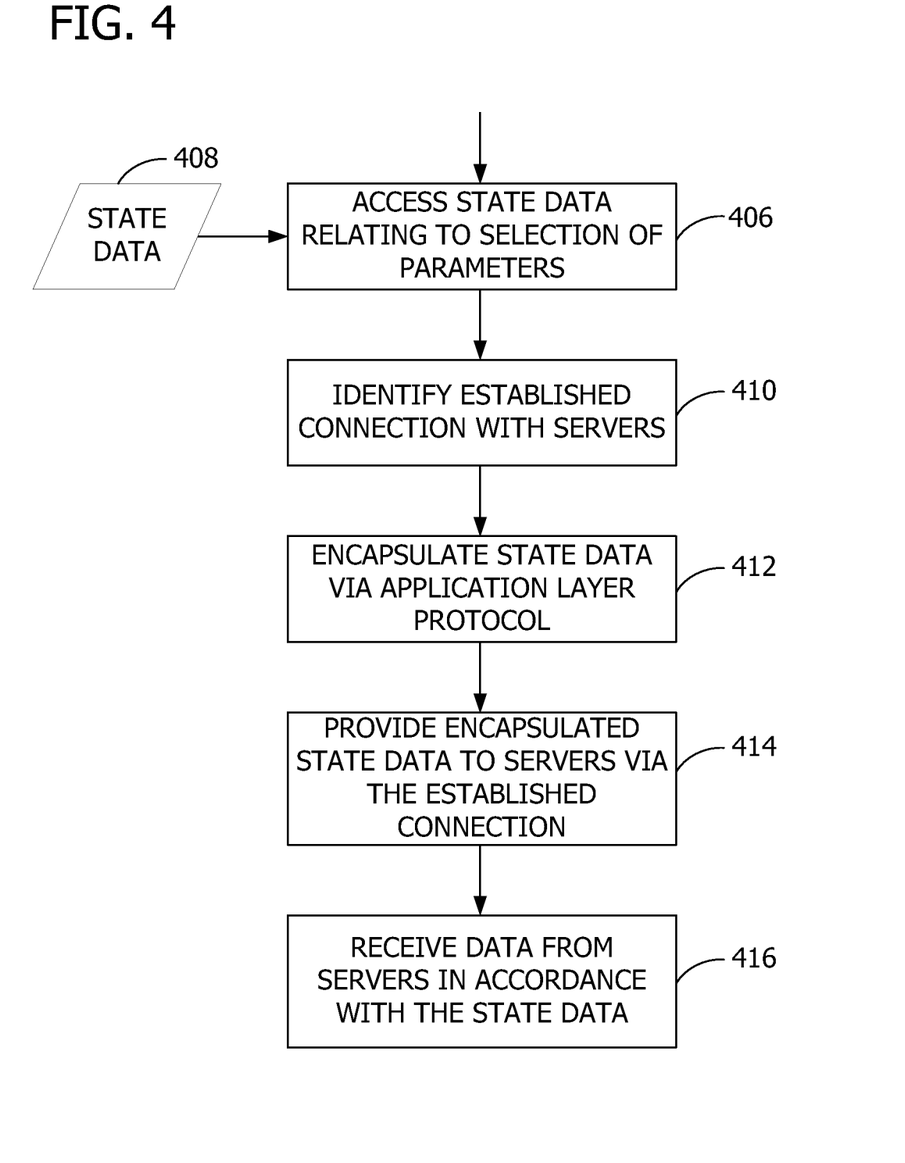
FIG. 4 is an exemplary flow chart illustrating operation of the computing device to provide state data to the servers.

While aspects of the invention are described and illustrated herein as being applicable to schedules 304, some embodiments of the invention are implemented without scheduling concepts. For example, FIG. 4 illustrates the transmission of device state data.

Further, while aspects of the invention are described and illustrated herein as being applicable to the servers 106 sending data to the computing device 102 responsive to the computing device 102 sends state data to the servers 106, the servers 106 may comprise other computing devices such as the proxy server 204, an enterprise server, or any other device sending data or managing the sending of data to the computing device 102.

For example, the computing device 102 provides the state data to a service executing on the proxy server 204 to which multiple application programs on the servers 106 subscribe to share the state data. Further, while described in some embodiments with reference to the mobile device 202, aspects of the invention are operable with other devices such as laptop computers, hand-held navigation devices, or any other devices communicating with other devices. Additionally, while described in some embodiments with reference to the scheduler 101 or a scheduler service, aspects of the invention are applicable to any component, instructions, or logic performing the functionality illustrated and described herein.

Figure 3:
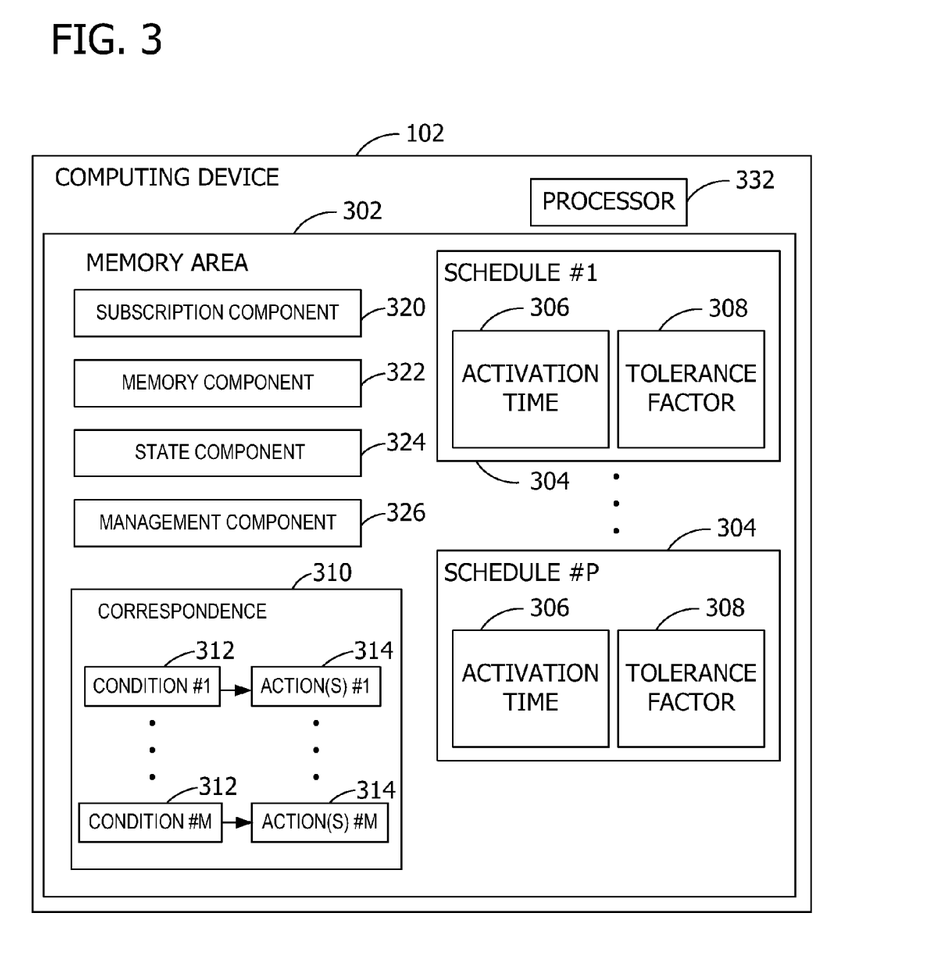
FIG. 3 is an exemplary block diagram illustrating a computing device having a memory area with computer-executable components and a plurality of schedules.

Referring next to FIG. 3, an exemplary block diagram illustrates the computing device 102 having a memory area 302. The memory area 302 stores computer-executable components and a plurality of the schedules 304 such as schedule #1 through schedule #P, where P is a positive integer. Some of the schedules 304 are associated with, provided by, and executed by the server 106 to transmit data to the computing device 102. For example, the computing device 102 receives the schedules 304 from the servers 106 via an interface component 328. Other schedules 304 are associated with one or more application programs executing on the computing device 102. Each of the schedules 304 has an activation time 306 and a tolerance factor 308 associated therewith, among other properties (e.g., rules for schedule expiration, maximum schedule run count, whether the schedule 304 requires use of any resource, etc.). One or more of the schedules 304 use a power-consuming resource associated with the computing device 102 during execution. In embodiments in which the computing device 102 is a mobile device 202, the power-consuming resource includes one or more of the following: a radio frequency transmitter, a backlight, a processor, an audio amplifier, a global positioning system, a digital memory, a short-range wireless network adapter, an auxiliary processor, a vibration motor, a ringer, a camera, an accelerometer, and an ambient light sensor. The tolerance factor 308 generally indicates the tolerance of the schedule 304 to run early when the resource becomes available. The tolerance factor 308 includes any means for indicating the availability of the schedule 304 to execute at a time that differs from its defined activation time 306. For example, the tolerance factor 308 includes, but is not limited to, a constant value (e.g., in minutes or seconds), a percentage (e.g., a percentage of an interval duration such as 10%), and a rolling average of the minutes between resource availability.

Execution of the schedules 304 includes performing or executing one or more actions 314 associated with the schedules 304 at the activation time 306 within the tolerance. In the example of FIG. 2, the scheduler 101 has knowledge of one or more future radio usage requests.

The computer-executable components operate to extend battery life of the computing device 102 by optimizing use of the available power-consuming resources on the computing device 102. The servers 106 modulate when to send data (e.g., batching versus storing), how much data to send, the type of data to send, and more based on a state of the computing device 102 and network conditions. The components are executed by a processor 332. In an embodiment, the processor 332 is transformed into a special purpose microprocessor by executing computer-executable instructions or by otherwise being programmed. Exemplary components include a subscription component 320, a memory component 322, a state component 324, and a management component 326. The subscription component 320 receives, from one or more of the servers 106, a selection of one or more parameters from a plurality of parameters. The plurality of parameters correspond to conditions 312 associated with the computing device 102 such as condition #1 through condition #M, where M is a positive integer. The memory component 322 stores a correspondence 310 between each of the conditions 312 and one or more actions 314 or settings, such as action #1 through action #M.

The state component 324 determines parameter values associated with the selection of the one or more parameters received by the subscription component 320. The management component 326 identifies the actions 314 corresponding to the determined parameter values based on the correspondence 310 stored by the memory component 322. The management component 326 further provides the identified actions 314 to the servers 106 that subscribed to the corresponding parameters. For example, the management component 326 provides the identified actions 314 to the server 106 using an application layer protocol, or any other layer of the protocol stack, over an established connection between the computing device 102 and the servers 106. The application layer protocol services multiple applications. In a multi-layer protocol model, each layer down encapsulates the packet from the layer above. The identified actions 314 are injected at the transport layer onto a data exchange that is already ongoing (e.g., an existing connection/socket). In some embodiments, the transport layer is used with tags and hooks so that communications are encoded into a socket that an application is already using (e.g., use the same socket). For example, the management component 326 "piggybacks" on the established connection to send the identified actions 314 or other data to the servers 106 via a generic protocol. The piggybacking occurs independent of the application that opened and is maintaining the channel. The application layer protocol is any data protocol that is available on the computing device 102. The generic protocol is positioned between a network layer and the application protocol, in some embodiments, and runs on any device and any server 106. This enables aspects of the invention to be operable with existing technologies and reduces reliance on custom technologies. In some embodiments, the generic protocol is scoped to a pre-defined list of device and network conditions that enable the servers 106 to better push data to the computing device 102 (or multiple computing devices). For example, the scope does not include application-specific properties like authentication, data synchronization, and the like. Each of the conditions 312 may be represented by one bit to keep the generic protocol lightweight. In some embodiments, the meanings of particular bits may be predetermined or dynamically allocated. Further, the bits may be transmitted along with another packet to be sent to naturally piggyback on that other packet.

Alternatively or in addition, the identified actions 314 or other data are sent via a "sideband" channel. The computing device 102 and the servers 106 open an additional set of sockets to negotiate the availability and version of a side band link service provider. For example, the computing device 102 opens a primary port or begins transmitting data to the desired port. The computing device 102 and servers 106 exchange data over the primary port at will. The computing device 102 opens a second port to detect and negotiate availability of a side band service by sending its version. The servers 106 respond on the second port stating availability and version to use. After the side band is established, a test packet or other data packet is sent in each direction to activate the side band. Each packet after the test packet has the ability to be augmented with additional data forming the side band channel.

In some embodiments, the management component 326 provides the identified actions 314 to the servers 106 as recommended actions 314, along with the determined parameter values indicating the corresponding conditions 312 associated with the computing device 102 that were used to identify the recommended actions 314. In such embodiments, the servers 106 are authorized to override the recommended actions 314. For example, if the recommended actions 314 indicate that the servers 106 should store all data, the servers 106 may opt to continue transmitting data such as heartbeat pings to maintain the connection with the computing device 102.

Referring next to FIG. 4, an exemplary flow chart illustrates operation of the computing device 102 (e.g., first computing device) to provide state data to the servers 106 (e.g., second computing devices). The first computing device accesses at 406 state data 408 relating to resources associated with the first computing device. In some embodiments, the state data includes a plurality of parameters and corresponding parameter values. The second computing devices subscribe to receive such data by selecting, from a plurality of parameters, one or more of the parameters of interest. The state data relates to, for example, signal strength, battery, and network connections, whether the first computing device is moving, the location of the first computing device, and whether a telephone call is in progress.

For example, the second computing devices subscribe to receive a battery level parameter so that the second computing devices will only receive notices when the battery level is at 10% full, rather than sending random levels of battery capacity.

At 410, the first computing device identifies established connections between the first computing device and each of the second computing devices. At 412, the state data is encapsulated or otherwise bound to an application layer protocol. At 414, the encapsulated data is provided to the second computing devices via the corresponding identified connection. The second computing devices extract the state data from the packet and alter a scheduled transmission of data to the first computing device as a function of the state data. The first computing device receives at 416 the altered transmission of data from the second computing devices.

In some embodiments, the first computing device desires to send critical information to the second computing devices. The critical information represents, for example, a subset of the state data. In such embodiments, the first computing device does not wait for an established connection to become available. Rather, the first computing device may send the data out-of-band by establishing another connection with the second computing devices and provides the identified subset of the state data to the second computing devices. For example, the first computing device informs the second computing devices of low memory capacity of the first computing device and instructs the second computing devices not to send data. The decision to send the data out-of-band is a configurable setting.

Figure 5:
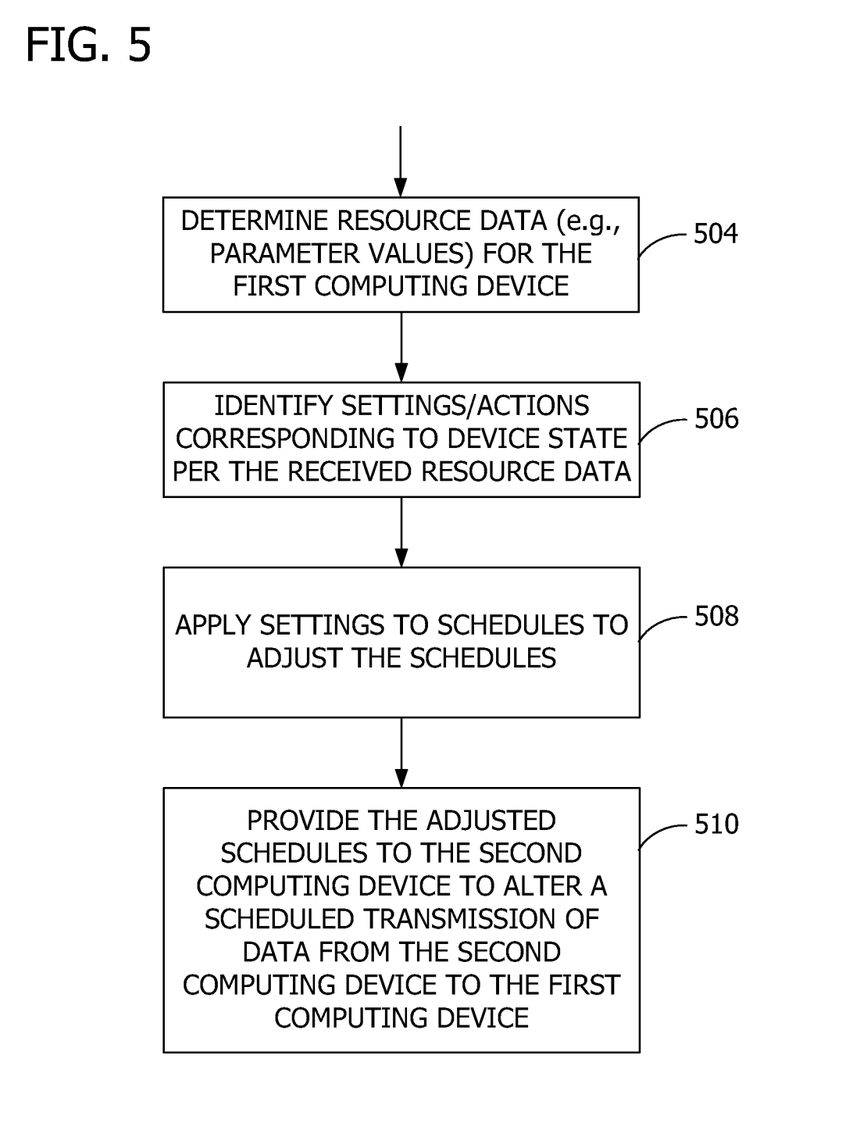
FIG. 5 is an exemplary flow chart illustrating operation of the computing device to adjust schedules for transmitting data from the servers to the computing device.

Referring next to FIG. 5, an exemplary flow chart illustrates operation of the computing device 102 to adjust schedules 304 for transmitting data from the servers 106 to the computing device 102. At 504, resource data for the first computing device is determined. The resource data corresponds to at least one of the conditions 312 or states of the first computing device. At 506, the memory area 302 is accessed as a function of at least one of the conditions 312 to identify the corresponding settings. At 508, the identified settings are applied to one or more of the schedules 304 stored in the memory area 302 to adjust the schedules 304. For example, the schedules 304 are identified based on the resource data (e.g., the schedules 304 that use the resource) or based on a current time (e.g., compare the current time with the activation time 306 of each of the schedules 304 to identify schedules 304 to activate). At 510, the adjusted schedules 304 are provided to the second computing device (e.g., encapsulated in a packet as a function of a protocol definition). For example, an adjusted activation time 306 is sent. The second computing device extracts the information from the adjusted schedules 304. The second computing device then sends the data to the first computing device based on the adjusted schedules 304. For example, the second computing device may batch the data for a period of time, send portions of the data, or send all the data based on the adjusted schedules 304.

Figure 6:
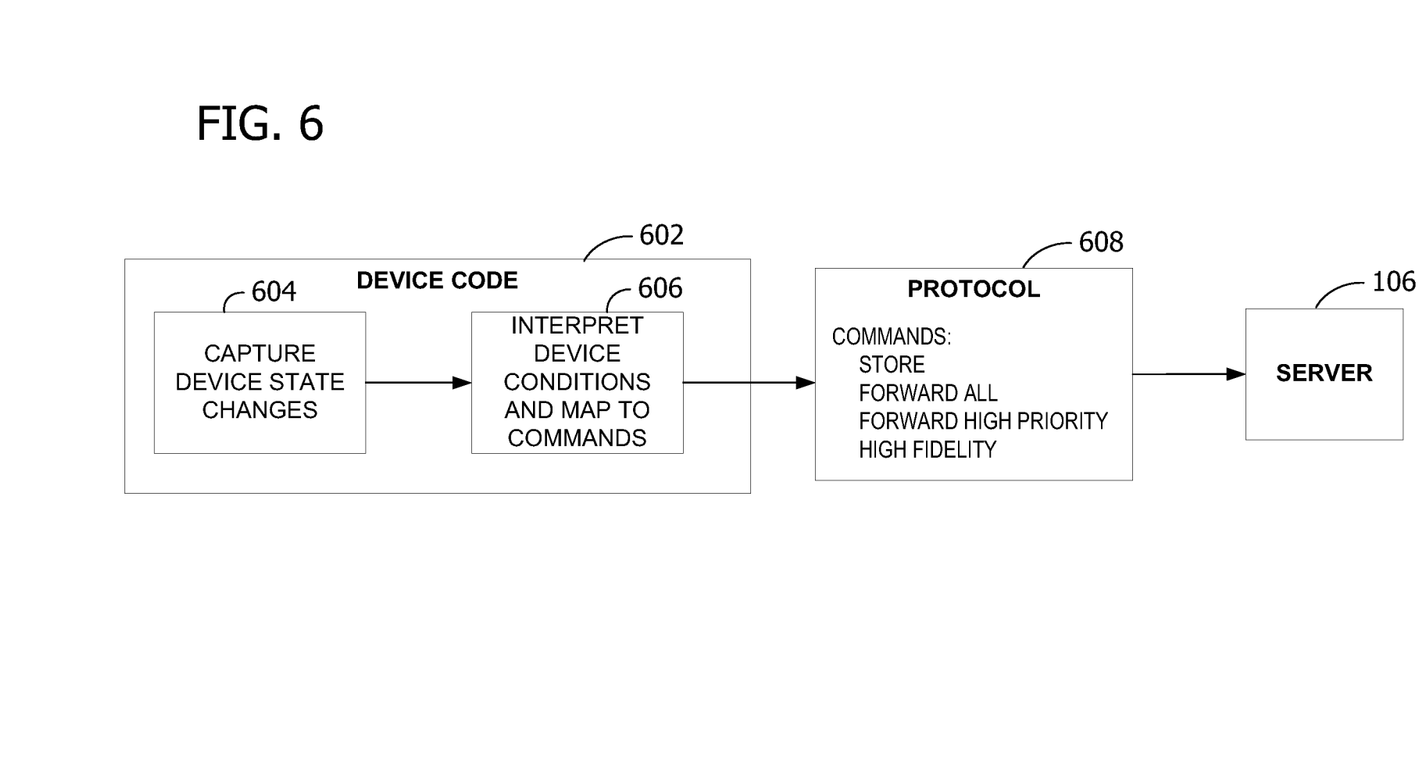
FIG. 6 is an exemplary block diagram illustrating a computing device executing device code to communicate commands to a server.

Referring next to FIG. 6, an exemplary block diagram illustrates the computing device 102 executing device code 602 to communicate commands to the server 106. Device code 602 executes on the computing device 102 to capture device state changes at 604 and to interpret and map the captured device state changes to commands at 606. The commands are sent at 608 via a protocol (e.g., the generic protocol) to the server 106.

For example, the device code 602 executes to listen for event triggers to indicate the device state changes such as the battery level being below x %, the battery level being below y % (where y is greater than x), the battery level is greater than y %, the storage memory is below x %, the storage memory is below y % (where y is greater than x), the storage memory is greater than y %, the computing device 102 is connected to high fidelity network connection or a desktop pass-through connection, and the computing device 102 being roaming. In such an embodiment, the component for capturing the device state changes at 604 may be updated by adding new events. For example, the servers 106 and the computing device 102 update the actual values (e.g., x or y) via a configuration file.

The component for interpreting at 606 the device conditions 312 takes the device state changes identified at 604 and maps each state to a command for the server 106. For example, the mapping between the device state changes and the commands is illustrated as the correspondence 310 between the conditions 312 and the actions 314 in FIG. 3. Having a separate component to interpret conditions 312 allows flexibility in defining how the state can be gauged or monitored to recommend the actions 314 without impacting the actual capturing of the state. In some embodiments, the protocol publishes one of the following commands: store, forward limited, forward normal, and forward all. Forward limited is less data than the configured settings, forward normal conforms to the configured settings, and forward all is more data than the configured settings. These commands are separate from the device state changes.

Example commands to the server 106 include, but are not limited to, the following: store data to be sent to the computing device 102 if the battery level is below x % and/or the storage memory is below x %, forward only high priority data (or forward high priority data first) if the battery level is below y % where y is greater than x and/or if the storage memory is below y % where y is greater than x, forward all data if the battery level is greater than y % and/or storage memory is greater than y % and the computing device 102 is not roaming, and forward data in a high fidelity format if battery level is greater than y % and/or storage memory is greater than y % and the computing device 102 is on a wireless fidelity (Wi-Fi) network or desktop pass-through connection. For example, if the computing device 102 is connected via Wi-Fi or a desktop pass-through, the servers 106 may want to provide advertising content.

The mapping between the device state changes and the commands anticipates different situations that may be encountered by the computing device 102. For example, if the computing device 102 is on a cellular network, the computing device 102 might wander into a roaming state at any time. In this example, the servers 106 send as much data is available to anticipate a future reduced-bandwidth connection. Further, while a particular network connection may not incur any costs to a user of the computing device 102, sending large amounts of data in a rich format may create a poor user experience or slow performance.

In some embodiments, the computing devices 102 and the servers 106 negotiate which commands are desired and supported. This enables expandability and further optimization of the generic protocol when only certain commands are useful in a particular environment.

In the example of FIG. 6, the computing device 102 publishes pre-defined commands. As described next with reference to FIG. 7, the computing device 102 publishes the events or other state data.

Figure 7:
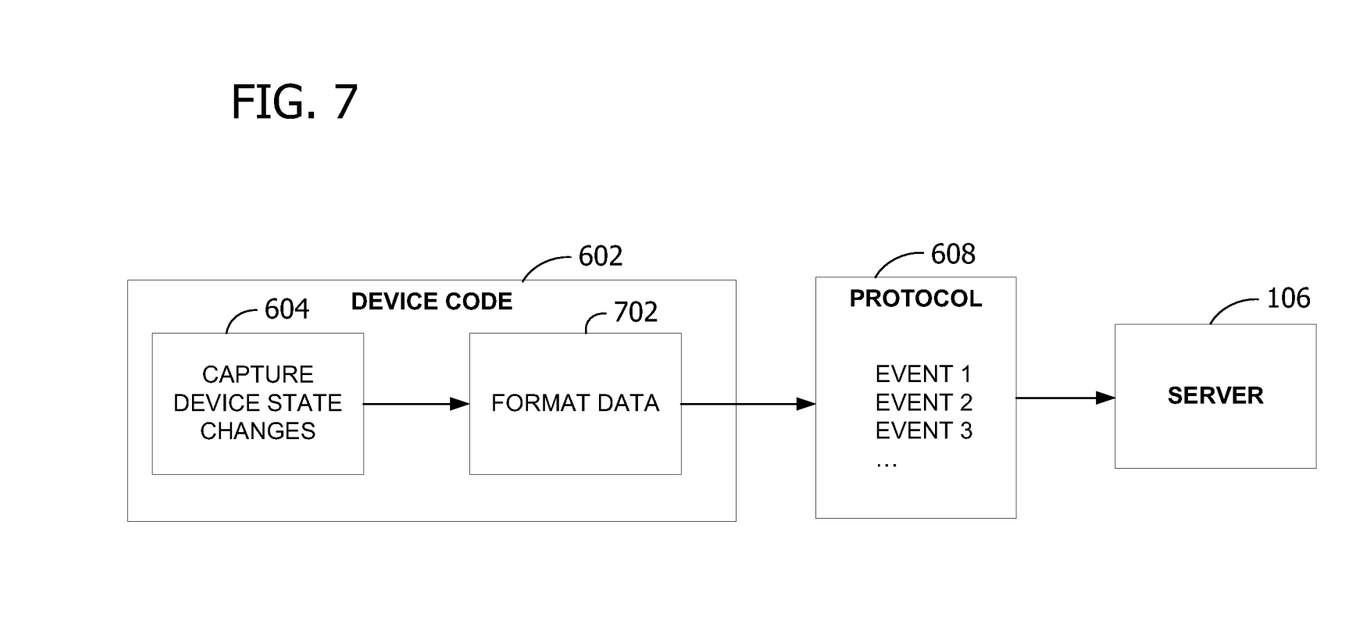
FIG. 7 is an exemplary block diagram illustrating a computing device executing device code to communicate events to a server.

Referring to FIG. 7, an exemplary block diagram illustrates the computing device 102 executing the device code 602 to communicate events to the server 106. The device code 602 on the computing device 102 listens, captures at 604, interprets, formats at 702, and sends at 608 event notifications to the servers 106. The event notifications are formatted at 702 to minimize bandwidth consumption. In this example, the server 106 selects a subset of the available states. In an embodiment in which the computing device 102 is a mobile device 202, the device states are published to any interested servers 106 when the mobile device 202 radio spins up to send data.

Aspects of the invention enable multiple scenarios for managing power-consuming resources on the computing device 102. Table 1 lists exemplary conditions 312 and corresponding possible actions 314, though other situations, contexts, and environments not specifically described herein are within embodiments of the invention.

TABLE 1

Exemplary Conditions and Corresponding Actions.

| Conditions/Device State | Exemplary Actions/Settings |
|---|---|
| Critically low battery level | A possible server response is to pause data transmission on the notion that the user prioritizes a functional telephone first. |
| Battery recovery watermark | When reached, the server resumes data transmission |
| Bandwidth capacity | The servers send data that is formatted to optimize latency (e.g., scaled down or partial images, lower resolution, plain text instead of a rich format, headers only, or high-priority mail first). If the computing device is on Wi-Fi, the servers send a significant amount of data for caching in anticipation of a future los in coverage. |
| Bandwidth available | The server modulates the type or size data transmission. |
| Energy per bit | Low energy per bit tells server to send a significant amount of data for caching. |
| Roaming/non-roaming | If roaming, send only high priority data. |
| Cell tower and home network | If the computing device has very strong signal strength, the server should send a significant amount of data for caching. |
| Cell coverage prediction | There are location routines that the networking stack has exposed, and are used to determine the location of the computing device. Operator cell towers are relatively fixed in their location, and a local cache of the cell tower map is maintained to predict the coverage as the computing device moves. This helps the server anticipate blackout periods when the computing device may not be reachable. |
| Signal reliability | If the signal reliability is low, the servers send only high priority data, headers only, or selected emails. |
| Storage memory low and recovery watermark | The servers send headers only, high priority data, or lower the filtering limit. |
| Smart caching | With high cache availability, the servers send a significant amount of content. When the cache is low, the servers hold off. |
| Network and network timeout | This tells the servers when to send heartbeat pings. |
| Predicting network availability | The servers increase a caching load in high coverage areas so users remain productive when the computing device is later in low coverage. |

Other exemplary scenarios supported by embodiments of the invention are next described. In examples in which advertising is a source of income, the advertising content is downloaded in a way that does not interfere with the telephone activities or cost data charges. For example, the advertising content is limited to not consume so much storage such that the user's content (e.g., email, media, pictures, etc.) is impacted. The servers 106 detect when the device network, storage and battery are conducive to downloading advertising content based on embodiments of the invention.

During low battery and low storage conditions, servers 106 store data or only send high priority data so that the telephone component of the computing device 102 remains available. While the user is downloading a big file and consuming most of the available bandwidth, the protocol publishes to other servers 106 the command to send low-fidelity data.

In another scenario, the user downloads a television show from a media service that consumes most of the bandwidth of the mobile device 202. Meanwhile, a social networking account has major updates to send but cannot since the mobile device 202 bandwidth is mostly full. In this scenario, the servers 106 delay the social networking update until the mobile device 202 bandwidth becomes more available. In another scenario, the user travels for business so the mobile device 202 connects on many cellular networks. When the user is in a strong signal strength coverage area, the mobile device 202 and web services are smart enough to cache useful data. As the user travels into a dead coverage area, the user finds that productivity may be maintained with the mobile device 202 because of the cached data. In another scenario, the user connects the computing device 102 to a free wireless network access point. The computing device 102 communicates the availability of the network access to the servers 106. The servers 106 update the mobile device 202 with the latest movie previews, blog entries, shopping deals, music, weather, and other bandwidth-intensive content.

Exemplary Operating Environment

A computer or computing device 102 such as described herein has one or more processors or processing units, system memory, and some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

The computer may operate in a networked environment using logical connections to one or more remote computers, such as a remote computer. Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. Aspects of the invention may also be practiced in distributed computing environments where tasks are performed by remote processing devices that are linked through a communications network. In a distributed computing environment, program modules may be located in both local and remote computer storage media including memory storage devices.

The embodiments illustrated and described herein as well as embodiments not specifically described herein but within the scope of aspects of the invention constitute exemplary means for altering a scheduled transmission of data to the computing device 102 responsive to the resource data, and exemplary means for opportunistic communication between the first computing device and the second computing device to manage data delivery from the first computing device to the second computing device.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for managing delivery of content to a computing device, said system comprising:
   a memory area associated with a first computing device, said memory area storing state data relating to a battery of the first computing device, said state data including a location of the first computing device; and
   a processor programmed to:
   access the state data stored in the memory area;
   identify an established connection between the first computing device and a second computing device, said first computing device and said second computing device being connected via a network;
   provide the accessed state data to the second computing device via the identified connection, wherein the second computing device alters a scheduled time for transmission of content from the second computing device to the first computing device as a function of the accessed state data based on a state of the battery on the first computing device, wherein providing the accessed state data to the second computing device includes providing a value of remaining battery capacity when the value of the remaining battery capacity falls below a threshold value; and
   receive, by the first computing device at the altered time, the transmission of content from the second computing device.

2. The system of claim 1, wherein the processor is further programmed to encapsulate the accessed state data via an application layer protocol, and wherein the processor provides the accessed state data by providing the encapsulated state data to the second computing device via the identified connection.

3. The system of claim 1, wherein the processor is further programmed to bind the state data to an application layer protocol.

4. The system of claim 1, wherein the processor is further programmed to collect the state data relating to one or more of the following: signal strength, battery, network connections, whether the first computing device is moving, and whether a telephone call is in progress for the first computing device.

5. The system of claim 1, wherein the state data comprises a plurality of parameters and corresponding parameter values, and wherein the processor is further programmed to:
   provide the plurality of parameters to the second computing device; and
   receive, from the second computing device, a selected plurality of parameters, wherein the processor is programmed to provide the accessed state data by providing the parameter values corresponding to the selected plurality of parameters.

6. The system of claim 1, wherein the processor is further programmed to:
   identify a subset of the accessed state data, said identified subset representing critical data;
   establish another connection between the first computing device and the second computing device; and
   provide the identified subset from the first computing device to the second computing device using the established another connection.

7. The system of claim 6, wherein the identified subset of the accessed state data indicates low memory capacity of the first computing device.

8. The system of claim 1, wherein the processor is further programmed to select and provide one or more of the following commands to the second computing device based on the accessed state data: store, forward limited, forward normal, and forward all.

9. A method comprising:
   accessing state data relating to a battery associated with a first computing device, said state data including a location of the first computing device;

identifying an established connection between the first computing device and a second computing device, said first computing device and said second computing device being connected via a network;

providing the accessed state data to the second computing device via the identified connection, wherein the second computing device alters a scheduled time for transmission of content from the second computing device to the first computing device as a function of the accessed state data based on a state of the battery on the first computing device, wherein providing the accessed state data to the second computing device includes providing a value of remaining useable memory when the value of the remaining useable memory falls below a threshold value; and receiving, by the first computing device at the altered time, the transmission of content from the second computing device.

10. The method of claim 9, further comprising encapsulating the accessed state data via an application layer protocol, and wherein providing the accessed state data comprises providing the encapsulated state data to the second computing device via the identified connection.

11. The method of claim 9, further comprising binding the state data to an application layer protocol.

12. The method of claim 9, further comprising collecting the state data relating to one or more of the following: signal strength, battery, network connections, whether the first computing device is moving, and whether a telephone call is in progress for the first computing device.

13. The method of claim 9, wherein the state data comprises a plurality of parameters and corresponding parameter values, and further comprising:
providing the plurality of parameters to the second computing device; and
receiving, from the second computing device, a selected plurality of parameters, wherein providing the accessed state data comprises providing the parameter values corresponding to the selected plurality of parameters.

14. The method of claim 9, further comprising:
identifying a subset of the accessed state data, said identified subset representing critical data;
establishing another connection between the first computing device and the second computing device; and
providing the identified subset from the first computing device to the second computing device using the established another connection.

15. The method of claim 14, wherein the identified subset of the accessed state data indicates low memory capacity of the first computing device.

16. One or more computer-readable storage devices storing computer-executable components for managing delivery of content to a mobile device, said components comprising:
a subscription component associated with the mobile device for receiving, from a server, a selection of a battery level parameter from a plurality of parameters, said plurality of parameters corresponding to state conditions associated with one or more power-consuming resources of the mobile device;
a memory component associated with the mobile device for storing a correspondence between each of the state conditions and one or more actions;
a state component associated with the mobile device for determining a battery parameter value associated with the battery parameter based on the state conditions of the mobile device, wherein determining the battery parameter value includes determining a remaining battery capacity value and comparing the determined remaining battery capacity value with a threshold battery capacity value; and
a management component associated with the mobile device for:
identifying, by the mobile device, the actions corresponding to the determined battery parameter value based on the correspondence stored by the memory component; and
providing the identified actions from the mobile device to the server, wherein the server alters a scheduled time for transmission of content from the server to the mobile device based on the identified actions.

17. The computer-readable storage devices of claim 16, wherein the management component provides the identified actions to the server to alter one or more of the following associated with the scheduled time for transmission of content: an activation time, a data type, a data speed, a bandwidth, and a protocol.

18. The computer-readable storage devices of claim 16, wherein the management component provides one or more of the following commands to the server: store, forward limited, forward normal, and forward all.

19. The computer-readable storage devices of claim 16, wherein the management component provides the identified actions to the server using an application layer protocol over an established connection between the mobile device and the server.

20. The computer-readable storage devices of claim 16, wherein the management component provides the identified actions to the server as recommended actions, and further provides the determined battery parameter value to the server to indicate the corresponding state conditions associated with the mobile device.

* * * * *